Figure 1:
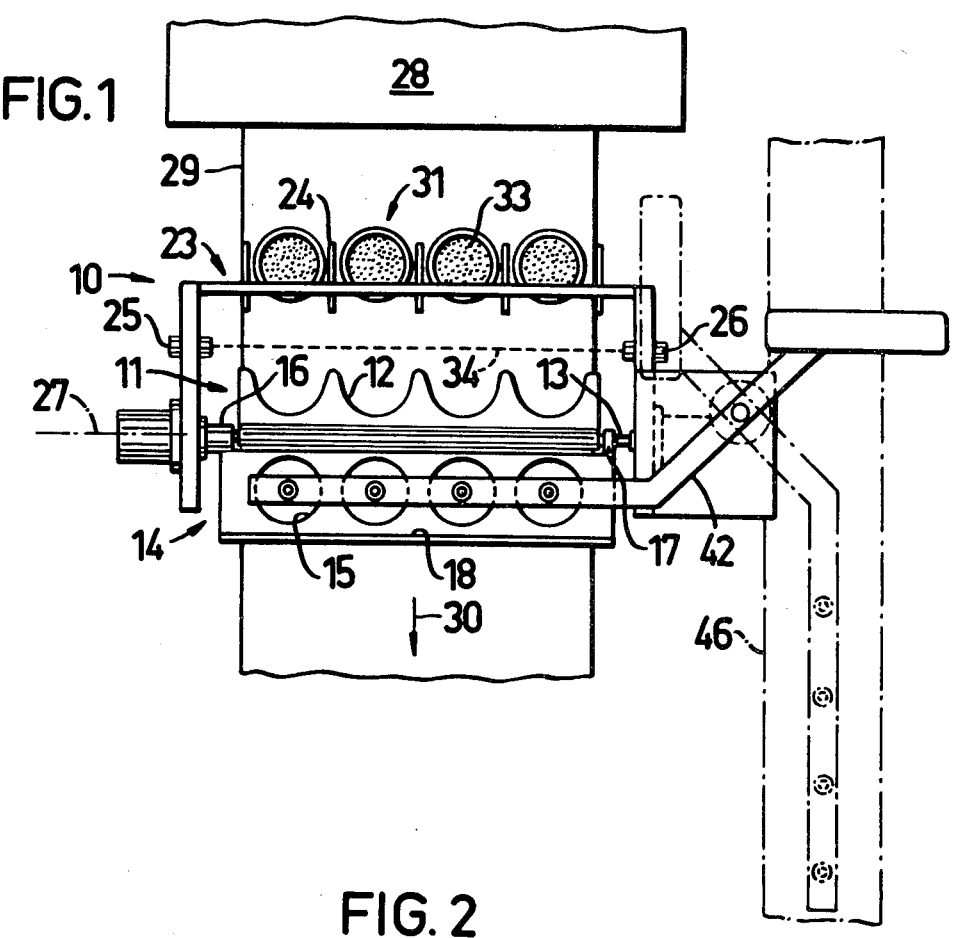

United States Patent [19]

Lohman

[11] 4,440,210
[45] Apr. 3, 1984

[54] MOLD STRIPPER

[76] Inventor: Rune Lohman, 16 Smedjevägen, S-131 00 Nacka, Sweden

[21] Appl. No.: 318,193

[22] Filed: Nov. 4, 1981

[30] Foreign Application Priority Data

Nov. 5, 1980 [SE] Sweden .............................. 8007751

[51] Int. Cl.³ .......................................... B22C 17/08
[52] U.S. Cl. .................................... 164/409; 164/224
[58] Field of Search .............. 164/409, 402, 401, 344, 164/183, 185, 224; 414/421

[56] References Cited

U.S. PATENT DOCUMENTS 4,172,488 10/1979 Miller .................................. 164/409

FOREIGN PATENT DOCUMENTS 519357 2/1931 Fed. Rep. of Germany ...... 164/409

Primary Examiner—Kuang Y. Lin
Attorney, Agent, or Firm—Cushman, Darby & Cushman

[57] ABSTRACT

An apparatus for automatically stripping the content from molds advanced on a conveying surface, comprising a mold turn-over means, which is located above the conveying surface and pivotal between two end positions in parallel with the conveying surface, for receiving in one end position one or more molds approaching on the conveying surface to the mold turn-over means, and in the other end position delivering the molds on a mold receiving means, by means of which the content of the molds can be delivered onto the conveying surface.

9 Claims, 10 Drawing Figures

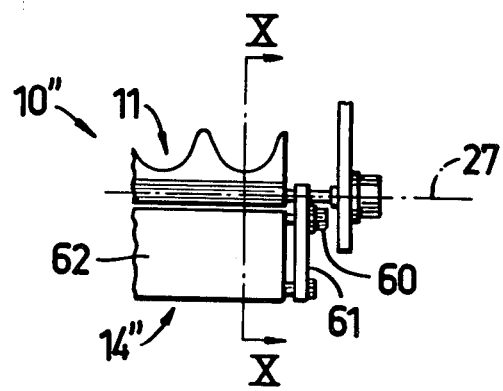
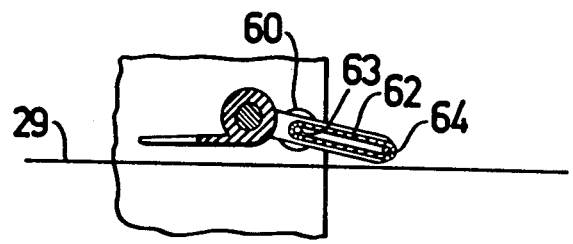

MOLD STRIPPER

This invention relates to an apparatus for automatically separating the contents from a mold advanced on a conveying surface.

At a known apparatus of this kind the filled molds are advanced from a first belt conveyor to a rotary body, which is located to the side of the conveying belt and rotatable about a horizontal axle. The molds are moved to the rotary body by means of a transfer device in the form of a pair of endless chains carrying a feeding plate. Each mold is retained by magnetic force at the rotary body, which after a rotation through half a revolution releases the mold down onto a second belt conveyor located perpendicularly to the first belt conveyor, which second belt conveyor advances the mold to a lifting means with a suction nozzle, which lifts the mold from its content and moves and positions the empty mold down onto a third belt conveyor. The contents of the mold discharged on the second belt conveyor finally is moved by a pusher up onto a fourth belt conveyor.

The present invention has the object to propose a mold stripper, which has a simpler structural design and includes a small number of movable parts, and which comprises a unit for turning-over and removing the mold which can be installed easily in connection to an existing belt conveyor for the discharge of molds, for example from a baker's oven.

The mold stripper according to the invention comprises, at one embodiment thereof, a unit, which is located above a conveying surface, such as a conveying belt for the discharge of molds from an oven, and consists of a mold turn-over means and a mold receiving means, which are pivotal about a horizontal axle located above said conveying surface. The mold turn-over means preferably is provided at its edge remote from the axle with a number of open recesses, which in the starting position of the mold turn-over means are directed to the molds approaching on the conveying surface, so that the molds can supportingly be received by the mold turn-over means. The mold receiving means pivotal in positions between the mold turn-over means and conveying surface is intended during the mold turn-over procedure to abut the upper surface of the molds and retain the molds against the mold turn-over means, in such a manner, that the mold turn-over means, molds and mold receiving means as one coherent unit are pivoted to a discharge position for the contents of the molds, which discharge position is in parallel with the conveying surface. The mold receiving means is provided with a number of opening slightly exceeding in size the openings of the retained molds and coinciding with the same, so that the contents of the molds in the position of discharge can fall out of the molds through the openings of the mold receiving means and down onto the conveying surface.

For the empty molds remaining on the mold receiving means in the discharge position, according to the invention two alternative embodiments of mold removers are proposed which may be rigidly mounted on the mold stripper.

Figure 2:
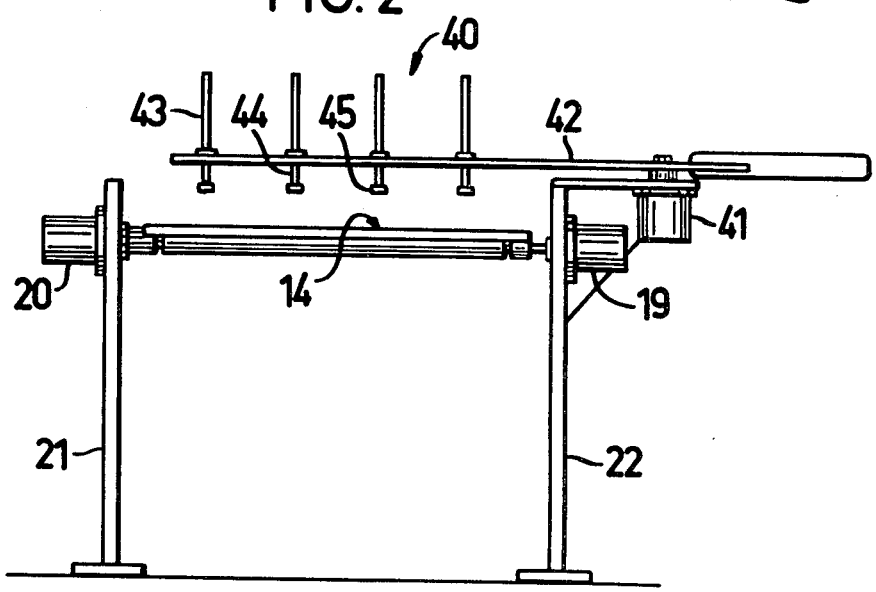
Figure 3:
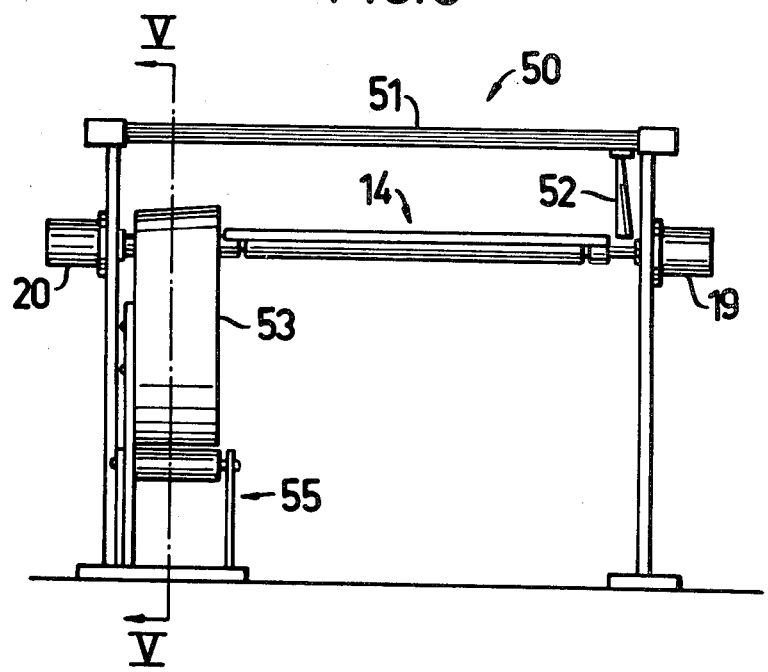
Figure 5:
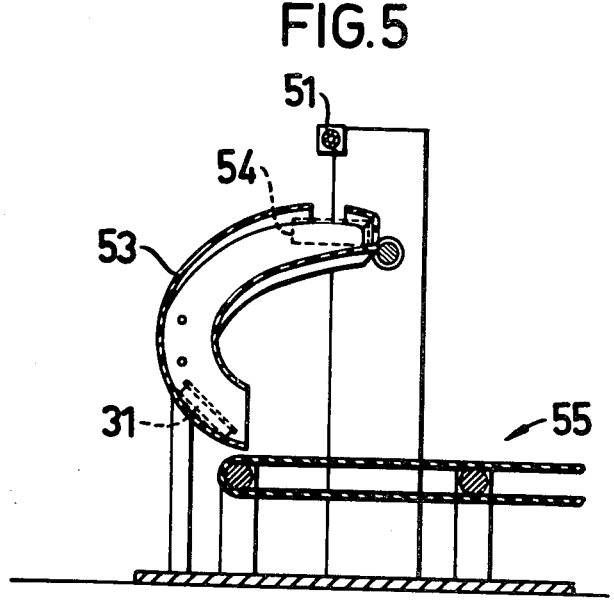
Figure 6:
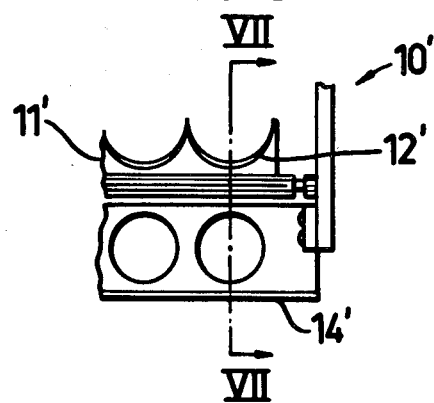
Figure 7:
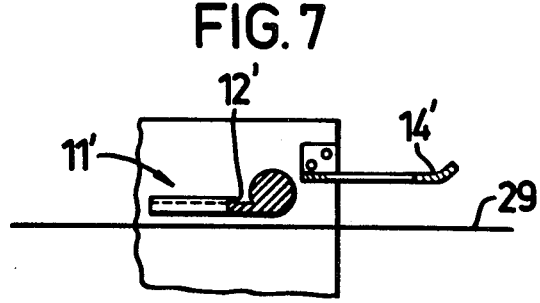
Figure 8:
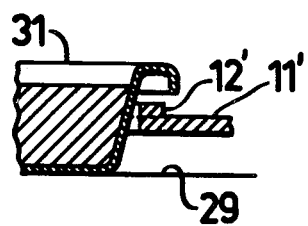

The invention is described in greater detail in the following, with reference to the accompanying drawings showing embodiments of the invention, in which drawings FIG. 1 is a plan view of a mold stripper in straddle arrangement above a conveying belt for molds, FIG. 2 is a front view of a mold stripper according to FIG. 1, FIG. 3 is a front view of a mold stripper with a mold remover designed in an alternative manner, FIG. 4 a-f show schematically part of the working procedure of the mold stripper, FIG. 5 is a section along the line V-13 V in FIG. 3, FIG. 6 is a horizontal view of a portion of a mold stripper with a rigidly mounted mold receiving means, FIG. 7 is a section along the line VII—VII in FIG. 6, FIG. 8 is a section on an enlarged scale through a portion of a mold received by the mold stripper according to FIGS. 6 and 7, FIG. 9 is a horizontal view of a portion of a mold stripper comprising a pivotal mold receiving means with an endless conveying belt, and FIG. 10 is a section along the line X—X in FIG. 9.

In FIG. 1 the mold stripper generally designated by 10 is located above an endless conveying elt 29, for example of steel, which upwardly in the Figure opens from an opening (not shown) of a baker's oven 28. On the belt 29 rows of molds 31 are advanced uninterruptedly in the direction of the arrow 30, which molds are filled with pastry 33, for example cake bottoms, baked in the oven 28. Between the oven 28 and a mold turn-over unit 11, 14 a mold aligner 23 is carried by the mold stripper 10 some distance above the belt 29 and transversely thereto. The mold aligner 23 has the configuration of a rod, on the lower side of which a number of fixed guide bars 24 are mounted transversely to the belt 29. The guide bars 24 are intended during the movement of the molds 31 with the belt 29 to engage with the outside surfaces of the molds and to align them in transverse direction on the belt before they are received by the mold turn-over means 11 described below. Between the mold aligner 23 and mold turn-over means 11 a pair of scanning members 25,26, for example a photoelectric cell arrangement, are located at the outer surfaces of the belt 29 some distance above the belt and intended to emit signals via a control unit (not shown) to turning motors described below of the mold stripper 10.

The mold turn-over unit of the mold stripper 10 comprises substantially only two movable parts, viz. a mold turn-over means 11 and a mold receiving means 14, which are pivotal about an axle common to both.

Figure 4:
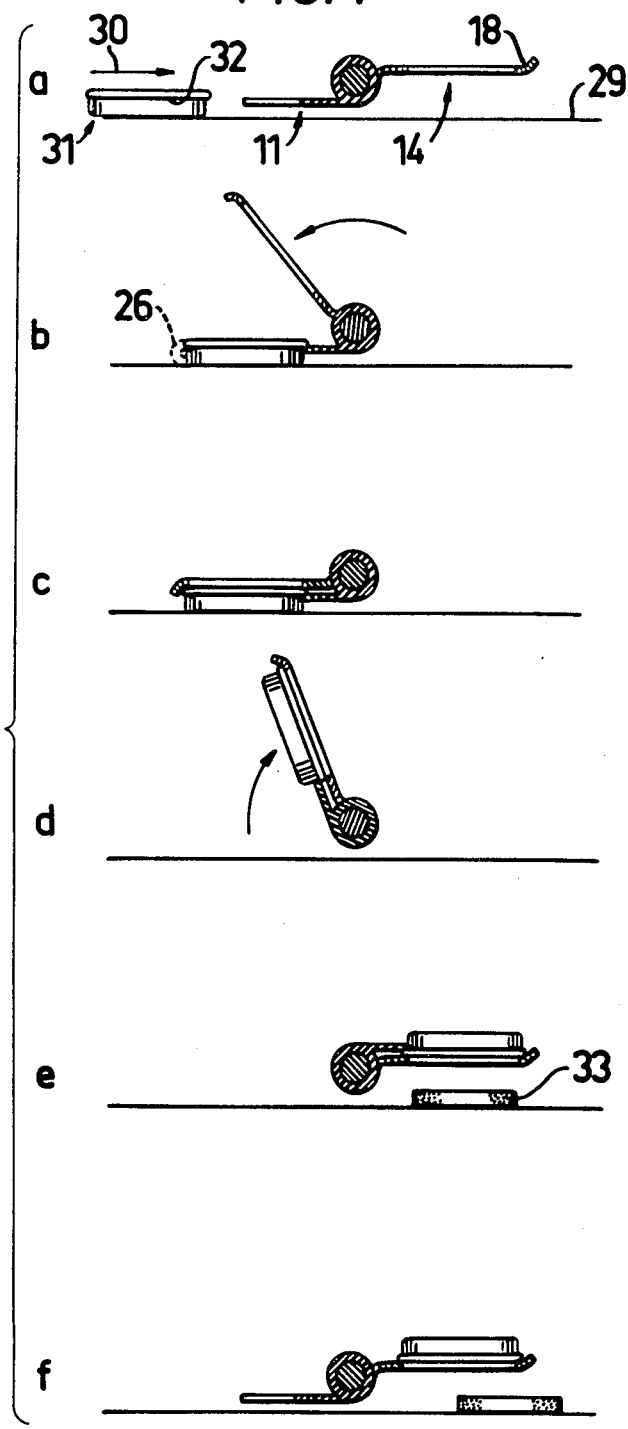

The mold turn-over means 11 consists of a plate, which is pivotal about the axle 27 and substantially radially outward directed along the axle 27, and which in the starting position shown in FIG. 4a is located a distance above and in parallel with the belt 29 and directed to the oven 28. The mold turn-over means 11 is provided along its side remote from the axle 27 with a plurality of equally spaced open recesses 12, each of which is formed in agreement with a portion of the outer outline of each mold 31. At the embodiment shown the molds 31 are circular, but may also have a different configuration, for example a rectangular one. Each mold 31 according to FIG. 4 preferably is provided with a flange 32 extending about the upper edge of the mold and intended during the initial phase of the turn-over operation described below to rest against the upper surface of the mold turn-over means 11 in the region of the corresponding recess 12 thereof.

The mold receiving means 14, which also is pivotal about the axle 27, consists like the mold turn-over means 11 of a plate, which is substantially outward directed from the axle 27, and which in the starting position shown in FIG. 4a is located some distance above and in parallel with the belt 29 and directed away from the oven 28. The mold receiving means 14 is provided over its length with a plurality of equally spaced openings 15, which are formed in agreement with the outline of the molds and have an opening cross-section insignificantly exceeding the opening cross-section of the molds 31, so that the upper surfaces of the flanges 32 of the molds can rest against the upper surface of the mold receiving means in the position shown in FIGS. 4e and 4f, while the contents of the molds can fall through the openings 15 down onto the belt 29, as will be explained further below.

At the embodiment shown in FIGS. 1 and 2 the mold turn-over unit is supported on a stand comprising two vertical stay members 21 and 22 located on both sides of the belt 29, which stay members can be attached to the support and/or to each other for providing a rigid structure. The scanning members 25,26 shown only in FIG. 1 and the mold aligner 23 are also supported on the stay members 21 and 22. At the upper portions of the stay members 21, 22 the respective axles 13 and 16 of the mold turn-over means 11 and mold receiving means 14 are mounted. The axle 13 rigidly connected to the mold turn-over means 11 is coupled at the stay member 22 with a reversible turning motor 19, which is attached to the outside of the stay member 22. The axle 16 rigidly connected to one end of the mold receiving means 14 is coupled in a corresponding way with a turning motor 20, which is attached to the outside of the stay member 21. The axle 16 of the mold receiving means at the embodiment shown is hollow for receiving and supporting the adjacent end of the axle 13 of the mold turn-over means 11. The other end of the mold receiving means 14 is attached to a sleeve 17, which is mounted rotatably on the axle 13 of the mold turn-over means 11.

The mold stripper 10 operates as follows, with reference to FIGS. 1 and 4a–f. The row of molds 31, which during the movement in the direction of the arrow 30 on the belt 29 are next in turn to be stripped from the contents 33 of the molds, block or interrupt the scanning beam 34 of the scanning members 25,26 after the molds have passed the mold aligner 23. Thereafter the molds in the row are advanced to engagement with the mold turn-over means 11, whereby the flanges 32 of the molds abut the upper surface of the mold turn-over means 11 or are located slightly above the same in the region of the recesses 12. In this position the blocking of the beam 34 ceases, and the scanning members 25,26 emit over said control unit a signal for starting the turning motor 20 of the mold receiving means 14, so that the mold receiving means starts rotating counter-clockwise according to FIG. 4b. (Alternatively, the mold receiving means may wait for the molds lifted by the mold turn-over means in the position shown in FIG. 4b). When the mold receiving means 14 has assumed the position shown in FIG. 4c, the turning motor 19 of the mold turn-over means 11 receives via the control unit a starting signal by a limit switch (not shown) actuated by the mold receiving means 14. Thereafter the motor 19 of the mold turn-over means 11 turns the coherent unit of mold turn-over means 11, molds 31 and mold receiving means 14 clockwise according to FIG. 4d. It is hereby preferably attended to that the mold receiving means 14 during this turning motion abuts the molds with a small holding-together force by friction or spring action. When the motor 20 is a hydrostatic motor, this force advantageously can be obtained from the internal friction in the hydraulic liquid, while the motor 20 during this motion can operate as an (unloaded) pump. The position according to FIG. 4e preferably is assumed with a slight touch, so that the contents 34 of the molds is permitted to fall more easily by means of gravity from the molds 31 through the openings 15 of the mold receiving means down onto the belt 29. In order to retain the molds 31 in position during the turn-over operation, the mold receiving means 14 is provided on its outside with a flange 18 of slightly counter-clockwise direction. Upon assuming the position according to FIG. 4e, the mold turn-over means 11 or mold receiving means 14 actuate a further limit switch (not shown), which via said control unit emits a signal for starting the turning motor 19 of the mold turn-over means to carry out a return movement back to the starting position according to FIG. 4f, while the empty molds remain on the mold receiving means 14. Thereafter the control unit emits a signal for starting one of the mold removers used alternatively and described below.

Alternatively, the mold receiving means 14' according to FIGS. 6 and 7 may be rigidly mounted on the stand, and the mold turn-over unit of the mold stripper 10' comprises substantially only one movable part, viz. the mold turn-over means 11', which in starting position is located slightly closer to the conveying belt, and which in this case is so designed that upon its lifting of the mold 31 (FIG. 8) an upwardly projecting arc-shaped shoulder 12' on the upper surface of the mold turn-over means penetrates in below the flange of the mold 31, which flange has a cross-section resembling an inverted U, and retains the mold in place during the turn-over operation.

Two embodiments of devices for removing the row of molds 31 remaining after the turn-over operation on the mold receiving means are illustrated, one in FIGS. 1 and 2 and the other in FIGS. 3 and 5.

The mold remover 40 shown in FIGS. 1 and 2 comprises a horizontal arm 42, which is pivotal by a reversible turning motor 41 and in one end position indicated by fully drawn lines according to FIGS. 1 and 2 extends at a distance above the openings 15 of the mold receiving means. In the other end position indicated by dash-dotted lines the horizontal arm 42 extends above an endless return belt 46 indicated by dash-dotted line, which belt is intended to move the molds 31 delivered by the pivotal arm as described below to a region at the input side (not shown) of the oven 28. On the pivotal arm 42 shown angular only by way of example and provided with a counterweight, a number of vertical linear adjusting members, for example pneumatic cylinders 43, are mounted, the retractable and extensible piston rods 44 of which in the position indicated by fully drawn lines in FIGS. 1 and 2 each are located aligned with the central points of the respective openings 15 of the mold receiving means 14. On the free end of each piston rod 44 a gripping member 45 is mounted, which is intended with magnetic or suction force in extended position of the piston rod to catch the empty mold 31 lying on the upper surface of the mold receiving means 14 according to FIG. 4f in order upon retracting of the piston rod 44 to lift the mold to the pivotal arm 42. This arm then is pivoted with the molds to the position shown by dash-dotted line in FIG. 1 where the molds, possibly after repeated lowering of the piston rods 44 are delivered onto the return belt 46 for being conveyed, for example, to the region at the input side of the oven 28 for their further handling, such as washing-up or the like (cleaning and thereafter oiling of the molds).

Together with the mold remover 40 described above also a mold receiving means 14" of alternative design according to FIGS. 9 and 10 can be used, which like the mold receiving means according to FIG. 1 is mounted pivotally at the stand, with the difference, however, that the mold receiving surface consists of an endless conveying belt 62. Said endless conveying belt 62 runs over the two spaced axles 63 and 64 in order in the inclined position according to FIG. 10 of the mold receiving means 14" to move the contents of the molds to and down onto the conveying belt 29 of the oven. The axles 63 and 64 are mounted at the sides of the belt 62 in two lateral attachments 61 (of which only one is shown), which in their turn are mounted pivotally about the pivotal axle 27. At the outside of one lateral attachment 61 a motor 60, for example an electric motor, is mounted for driving the endless belt 62 via the axle 63. Contrary to the previous described embodiments, in this case the molds will be left unstripped from their contents on the mold receiving means 14", i.e on the endless conveying belt 62. The stripping operation is in this case performed by the gripping members 45 of the actuators 43 of the mold remover 40 (see FIG. 2), that lift the molds from their contents. After the stripping operation the contents left behind on the endless belt 62 will be carefully transformed, without falling, by the endless belt 62 to the conveying belt 29.

The mold remover 50 shown in FIG. 3 comprises a mold scraper 52, which is mounted vertically at a horizontal pneumatic cylinder 51, for example of the type ORIGA® without piston rod, and in the position of the mold stripper shown in FIG. 4f is intended to be moved to the left in FIG. 3, so that its lower end gets in contact with and moves the empty mold 31 located closest to said end to the left. The mold in its turn contacts the next mold, and so on, so that the molds leave the mold receiving means 14 at the left-hand end thereof. At this end a closed, vertical, curved groove 53 can be located which is provided with an upper inlet opening and a lower outlet opening according to FIGS. 3 and 5. When the molds 31 have left the mold receiving means 14, they fall down into the groove 53, in which they are moved by gravity to a belt conveyor 55, on which they are conveyed to some region for their further handling. After completed working stroke, the scraper 52 of the mold remover 50 returns immediately to the starting position to the side of the mold receiving means 14 according to FIG. 3.

The control unit (not shown) for the various operation movements preferably consists of a programmable electronic sequency control device, which is known on the market and in a way well-known per se is intended to receive signals from the aforesaid scanning members 25,26 and limit switches (not shown) and in a definite sequence to emit start and stop signals to the different adjusting devices 19,20 and 41, 43 or 51.

The unit of the mold stripper and the mold remover can be designed with a stand, or be mounted on a stand, which can be lifted and lowered manually or automatically in relation to the belt 29. This is not shown because many embodiments can be imagined.

The mold turn-over unit of the mold stripper 10 is not restricted only to the embodiments shown by way of example in the drawings, but a great number of modification are possible within the scope of the invention. The mold turn-over means 11, for example, can be provided, instead of with the recesses 12, with a single recess for receiving a single large mold, which in its turn can be divided into several small molds, for example for cookies and the like, while simultaneously the mold receiving means is modified in a suitable way in agreement with such mold turn-over means.

What I claim is:

1. An apparatus for automatically stripping upwardly open molds advanced on a conveying surface from their content, comprising mold turn-over means pivotal about a horizontal axis located above the conveying surface for swinging movement between first and second end positions in each of which said turn-over means is substantially in parallel with the conveying surface, said turn-over means having mold-engaging surfaces for receiving in said first end position at least one mold approaching on the conveying surface to the mold turn-over means, and mold receiving means also pivotal about said axis, said receiving means being swingable toward said turn-over means to a first position for retaining a mold against said turn-over means when said turn-over means is in its first end position, and said turn-over means and said receiving means being swingable together to said second end position whereby a mold held between said turn-over means and said receiving means becomes inverted, said receiving means having at least one opening which in said second position permits the content of a mold to fall through the mold receiving means and down onto the conveying surface.

2. An apparatus as defined in claim 1, wherein the mold turn-over means comprises a plate, which is directed substantially radially from said axis, and the end of which remote from the axis is provided with said mold-engaging surfaces in the form of at least one recess which is complementary to a portion of the outer outline of a mold.

3. An apparatus as in claim 2 wherein the openings in the mold receiving means have a cross-section exceeding slightly the opening cross-section of the molds.

4. An apparatus as in claim 1 including a mold remover which comprises a pivotal arm located in a horizontal plane above the mold receiving means and provided with at least one lifting member, which when the pivotal arm is in a position above the mold receiving means can catch and lift an empty mold from said retaining means when the latter is in said second position, said pivotal arm being swingable to a delivery position to deliver an empty mold outside the conveying surface.

5. An apparatus as in claim 1 including a mold remover which comprises a mold scraper located at a short distance above said receiving means when in said second position, said scraper being horizontally reciprocable for scraping an empty mold from the upper surface of the mold receiving means.

6. An apparatus for automatically stripping upwardly open molds advanced on a conveying surface from their content comprising mold turn-over means pivotal about a horizontal axis for swinging movement between first and second end positions in each of which said turn-over means is substantially in parallel with the conveying surface, said turn-over means having mold-engaging surfaces for receiving in said first end position at least one mold approaching on the conveying surface to the mold turn-over means whereby swinging of said turn-over means to said second position carries a mold to an inverted delivery position, and mold receiving means rigidly attached above and in parallel with the conveying surface at a location adjacent said second end position of said turn-over means for receiving a mold when said turn-over means is in said second end position, said receiving means having at least one opening permitting the content of a mold to fall through the mold receiving means and down onto the conveying surface.

7. An apparatus as in claim 6 wherein the mold turn-over means comprises a plate, which is directed substantially radially from said axis, and the end of which remote from said axis is provided with said mold-engaging surfaces in the form of at least one recess which is complementary to a portion of the outer outline of a mold.

8. An apparatus as in claim 7 adapted to strip flanged molds wherein along each of the recesses of the mold turn-over means an elevation is provided for engagement with the flanges of the molds, which flanges have downwardly open recesses.

9. An apparatus for automatically stripping upwardly open molds advanced on a conveying surface from their content, comprising mold turn-over means pivotal about a horizontal axis for swinging movement between first and second end positions in each of which said turn-over means is substantially in parallel with the conveying surface, said turn-over means having mold-engaging surfaces for receiving in said first end position at least one mold approaching on the conveying surface to the mold turn-over means, and mold receiving means also pivotal about said axis for swinging movement toward said turn-over means to a first end position for retaining a mold against said turn-over means when the latter is in said second end position, said turn-over means and said receiving means being swingable together to said second end position whereby a mold held between said turn-over means and said receiving means becomes inverted, said receiving means including an endless conveying belt, which in said second end position feeds the content of a mold to the conveying surface, and a mold remover including a pivotal arm located in a horizontal plane above said receiving means for swinging movement between first and second positions, said arm carrying at least one lifting member for lifting a mold from the contents thereof when said arm is in its first position and for delivering the resulting empty mold to a postion to one side of the conveying surface when said arm is in its second position.

* * * * *